Feb. 5, 1963     E. E. TENNANT     3,076,484
BEER DISPENSER
Filed Jan. 13, 1959     2 Sheets-Sheet 1
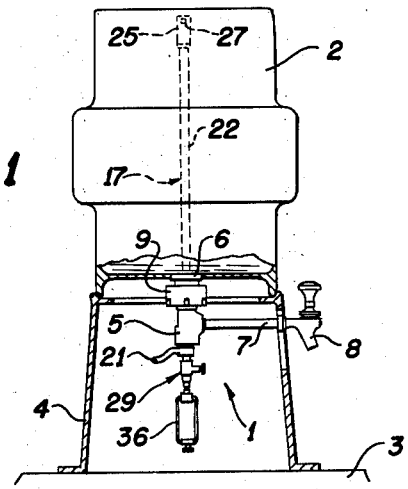
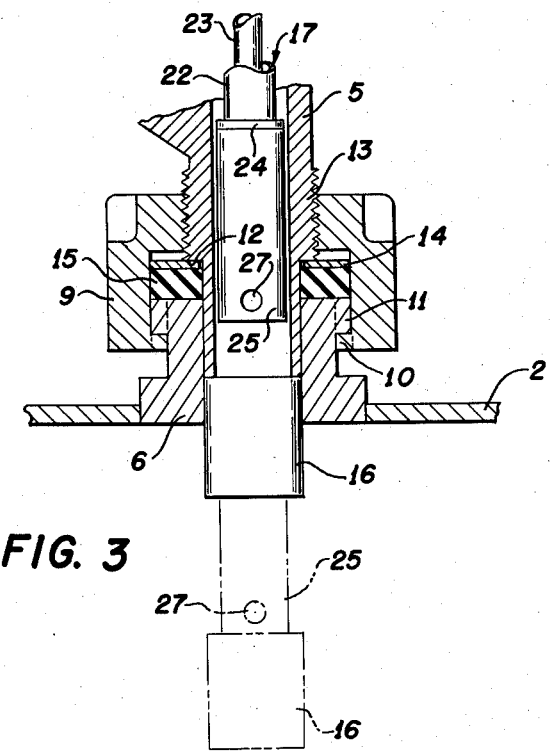
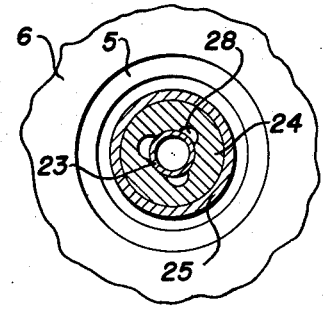
INVENTOR.
EDWARD E. TENNANT
BY
Andrus + Starke
Attorneys

United States Patent Office 3,076,484
Patented Feb. 5, 1963

3,076,484
BEER DISPENSER
Edward E. Tennant, Milwaukee, Wis., assignor to Jos. Schlitz Brewing Company, Milwaukee, Wis., a corporation of Wisconsin
Filed Jan. 13, 1959, Ser. No. 786,509
8 Claims. (Cl. 141—17)

This invention relates to beer dispensers, and particularly to beer dispensers utilizing gravity flow.

The dispenser of the present invention is adapted for use with beer kegs or the like, such as are frequently used for party, picnic and other related applications where no regular beer dispensing equipment is available. The present device is of the general type utilizing gravity flow of the contained beverage which type of dispenser is highly desirable inasmuch as no hand pump or other pressure device is required to force the beer from the keg. The dispenser of the invention constitutes an improvement over gravity feed devices previously employed for dispensing beer.

Heretofore with gravity flow dispensers, the initial draught of beer was characterized by a high gas content, with the beer usually emerging as foam due to the sudden release of the high pressure head formed in the keg during storage. Until the keg pressure dropped sufficiently to permit beer in liquid form to flow from the keg, the beer was allowed to run off or collected and set aside as waste. If it were thereafter desired to store the beer for later use, the absence of this pressure head caused the beer to become flat in taste and, as such, objectionable for consumption.

In addition, in some of the prior art dispensers, a tap rod into which beer entered was extended the length of the keg and thus was required to be suitably coated on both inner and outer surfaces with a substance non-injurious to beer. This coating was additional to that required for the vent tube which extended coaxially through the tap rod and which provided air to the top of the keg during draw-off of the beer.

Further, in many instances, to insert the dispenser into the keg it was necessary to position the end of the dispenser against the tap cork sealing the keg and strike the dispenser with an appreciable force to drive the cork from the opening and into the keg. Damage to the end of the dispenser, and in some instances, chipping of the keg lining resulted from this force.

These and other disadvantages of the prior art devices are overcome by the present gravity feed dispenser comprised of a tubular tap which forms the body of the dispenser and which is sealably connected at one end to a standard bushing carried by the keg. The connnected end of the tap extends into the bushing and is open to the keg to receive beer therefrom by gravity flow with the beer flowing from the tap through a faucet extending from the tap.

To adjust the pressure within the keg and to also provide for the continuous gravity flow of beer therefrom, a pair of coaxially spaced tubes are sealably inserted in the free end of the tap and extend therethrough to the upper end of the keg. The inner of the tubes constitutes an air vent and provides for the admission of air into the keg as beer is drawn off while preventing gas escape from the keg by means of a check valve supported on the upper end of the vent tube. The outer tube constitutes a bleeder tube and provides means for relieving the pressure head within the keg, with the gas escaping through the annular spaced formed between the two tubes.

According to the invention, a pressure head may be re-established in the keg where it is found desirable to store the beer for a period of time. For this purpose, the valve means of the vent tube is provided with an orifice communicating with the latter and seating an outwardly extending needle. A cartridge retaining bracket is removably secured to the valve and carries means by which a cartridge of compressed carbon-dioxide gas, may be forced against the needle, with the cartridge being pierced thereby to establish gas flow into the keg through the vent tube.

The accompanying drawings illustrate the best mode presently contemplated of carrying out the invention.

In the drawings:

FIGURE 1 is a schematic view of the dispenser of the invention inserted in a beer keg;

FIGURE 3 is a fragmentary view of the dispenser showing several successive assembly positions of the dispenser relative to the tap opening and the corresponding positions of the cork which seals the keg; and FIGURE 4 is a section along line 4—4 of FIG. 2.

Figure 2:
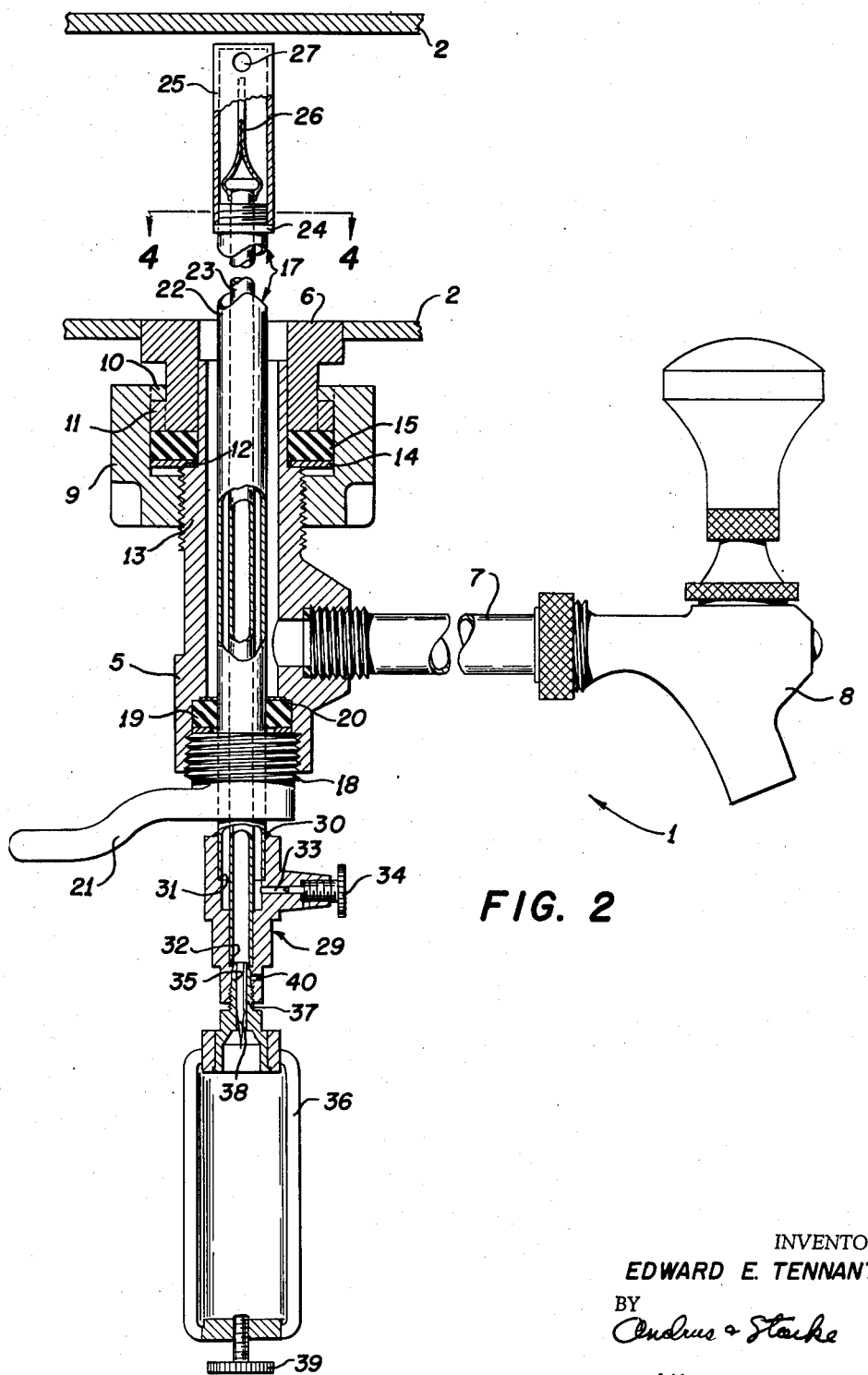
FIGURE 2 is an enlarged section of the dispenser of FIGURE 1 with parts broken away for clarity of illustration.

As illustrated in FIGURE 1, after the dispenser 1 has been applied to the keg 2 the latter is inverted and supported on a suitable platform 3 by means of the open stand 4. The tap body 5 of the dispenser 1 depends downwardly from the tap bushing 6 of keg 2 and is adapted to drain beer from the keg through a lateral tubular connection 7 and the usual faucet 8.

As illustrated in FIGS. 2 and 3, the tap body 5 of dispenser 1 is threaded into a sleeve 9 which has an internal peripheral flange 10 having a pair of diametric slots therein adapted to interlock with a pair of external lugs 11 on the tap bushing 6 of the keg 2 as by a bayonet joint. The inner end of tap body 5 is reduced in diameter to fit in the bore of the tap bushing 6 and to provide a shoulder 12 between it and the threaded portion 13 of the tap body. The shoulder 12 presses against a metal washer 14 which serves to compress a resilient rubber sealing washer 15 between washer 14 and the outer end of tap bushing 6 when the tap is threaded tightly into sleeve 9 with lugs 11 engaged within flange 10 in interlocked position.

The inner end of tap body 5 extends short of the inner end of tap bushing 6 in the final assembly so that when the assembly is initially made with the keg 2 in upright position as shown in FIGURE 3 the inner end of the tap body will initially engage cork 16 and force the same inwardly of the bushing 6 as the tap body is threaded into the sleeve to a position where only a light tap axially on the vent tube structure 17 will drive the cork free from bushing 6 as shown in dotted lines in FIGURE 3.

At this initial assembly time, and referring again to FIGURE 2, the threaded closure member 18 in the outer end of tap body 5 is loosely assembled with the tap body so that the rubber sealing washer 19 disposed between the member 18 and an internal shoulder 20 of the body is not fully compressed. This enables the vent tube structure 17 to respond to the tapping necessary to displace cork 16 from the tap bushing 6, and to be moved quickly inwardly to the final assembly position shown in FIGURE 2, whereupon the member 18 is threaded inwardly to compress washer 19 and seal the vent tube structure to the outer end of tap body 5. The radially extending handle 21 is secured to member 18 to facilitate rapid manual tightening of washer 19 to quickly seal the outer end of tap body 5 after the vent tube structure 17 has been moved to final assembly position, and before the keg is inverted.

The vent tube structure 17 comprises an outer tubular member 22 of substantialy smaller diameter than the inside diameter of tap body 5, and an inner co-axially disposed vent tube 23 housed in and protected by the outer tubular member 22.

The inner end of member 22 is closed by a suitable circular plug 24 welded thereto and which has an axial bore for tightly receiving and supporting the inner vent tube 23 which extends therethrough. A suitable tubular housing 25 is threaded to plug 24 and serves to cover and protect a rubber check valve 26 mounted on the inner end of vent tube 23.

The inner end of housing 25 is vented as by opening 27. The inside of housing 25 is also vented to the space between tubes 22 and 23 by means of vent openings 28 through plug 24, as shown in FIGURE 4.

The outer end of tubular member 22 fits into a bore in a hollow tubular vent valve body 29 and is sealed therewith by means of the fillet weld 30. An internal shoulder 31 in body 29 determines the end position for member 22 therein.

The outer end of vent tube 23 likewise fits tightly into a smaller bore in body 29 and against another internal shoulder 32.

A lateral vent opening 33 connects with the hollow inside of body 29 between the shoulder 31 and the smaller bore that receives vent tube 23, and is controlled by the thumb screw valve member 34. The valve 34 serves the purpose of releasing the gas pressure on the beer in keg 2 after the keg is inverted and before draining beer therefrom through faucet 8, so that a high pressure surge is not obtained at the initial draught of beer. This release is obtained by flow of the pressurized gas through opening 27, housing 25, openings 28, the circular space between tubes 22 and 23, the inside body of body 29 and vent opening 33. After release of the gas pressure, the valve 34 is closed.

The outer end of the tubular vent valve body 29 has an axial bore 35 which may be open for admitting air to vent tube 23 whereby air is permitted to pass upwardly through the tube, through check valve 26, housing 25 and opening 27 into the top of keg 2 for relieving any tendency for the formation of a vacuum in keg 2 caused by draining of liquid beer therefrom through faucet 8.

If it is desired to provide means for supplying $CO_2$ to the keg to prevent the beer from becoming flat in taste during storage following initial tapping of the keg, a capsule or cartridge holder 36 is provided with a threaded shank 37 adapted to be threaded into the outer end of bore 35 and having a tapered end adapted to seal against the inner corner of the end of tube 23. A hollow needle 38 is provided axially of shank 37 and extends into the holder 36 to pierce the end of a $CO_2$ capsule when the latter is inserted in the holder and the end thumb screw 39 tightened against the capsule to force it on the needle.

In order to make it unnecessary to remove the holder 36 from body 29 when it is desired to freely admit air to tube 23, a side vent opening 40 is provided in body 29 between the threads for receiving the shank 37 and the shoulder 32. This vent opening or orifice 40 is opened merely by partially unthreading shank 37 in body 29 to allow air to enter tube 23 around the loose inner end of shank 37. When shank 37 is threaded tightly in place the tapered seal between the inner end of the shank and the end of tube 23 closes the orifice 40 so that compressed gas from the $CO_2$ capsule will not escape through the orifice.

Dispenser 1 is assembled to the upright keg 2 by initially interengaging lugs 10 and 11 of sleeve 9 and bushing 6 respectively and then tightening tap body 5 to sleeve 9 to seal the connection and partially unseat cork 16. The loosely held vent tube structure 17 is then forced through tap body 5 to drive cork 16 from bushing 6 and to position tubular housing 25 adjacent the lower end of the keg. The dispenser is sealed to the keg by tightening threaded closure member 18 whereupon the keg is inverted and placed on stand 4.

The dispenser is readied for use by initially relieving the pressure within keg 2 by adjusting valve member 34 to permit gas flow through vent opening 33 and, after reclosing opening 33, adjusting shank 37 to uncover vent opening 40. Air is then free to flow into the keg and permit continuous beer flow therefrom upon opening faucet 8.

If it is desired to store for later use a keg which has been tapped in the manner indicated, vent opening 40 is first closed by its associated shank 37 and a $CO_2$ capsule placed in holder 36. Thumb screw 39 is next tightened against the capsule, causing needle 38 to pierce the same and establishing $CO_2$ flow through vent tube 23 to recharge the keg.

The dispenser of the invention is highly advantageous in that besides utilizing gravity flow for the discharge of the contained beer, thereby eliminating the need for pressure supplying means, means are provided to relieve the initial pressure within the keg and to re-establish such pressure as desired. Additionally, the assembly of the dispenser to the keg provides for the ready removal of the sealing cork from the keg without equipment damage. Further, the dispenser is of relatively simple and rugged construction and presents a minimum of surface area in contact with the contained beer.

Various modes of carrying out the invention are contemplated as being within the scope of the following claims particularly pointing out and distinctly claiming the subject matter regarded as the nature of the invention.

I claim:

1. A gravity dispenser for keg beer for assembly with a keg having a tap bushing in one end when the latter is uppermost, said tap bushing being closed by a plug, the assembly being then inverted for gravity draining of the beer through the dispenser, comprising a tubular tap body having an inner end fitting in the tap bushing of a keg and an inwardly facing external circumferential shoulder, a coupling sleeve threaded to the tap body outwardly of said shoulder and having an internal slotted flange interlocking with corresponding outward lugs on the tap bushing to thereby lock said tap body to said tap bushing, a sealing gasket interposed between the shoulder of said tap body and the outer end of the tap bushing for sealing the tap body to the keg upon said coupling sleeve being tightened to said tap bushing, the inner end of said tap body extending near to and short of the inner end of said tap bushing upon full threaded engagement between said tap body and coupling sleeve as determined by sealing compression of said sealing gasket whereby the threading of said tap body into said sleeve effects a partial ejection of the plug from the tap bushing by inward movement of the end of the tap body thereagainst, a dispensing faucet laterally secured to said tap body, a valved vent tube structure mounted axially through said tap body for axially slidable movement thereof and serving to drive the plug inwardly from the tap bushing, and means to seal said vent tube structure in the outer end of said tap body when the inner end of said structure is within the keg adjacent the opposite end of the keg from the tap bushing.

2. In combination with a beer keg having a tap bushing in the bottom end, a beer dispenser comprising a tubular tap body coupled to said tap bushing and adapted to receive beer by gravity flow from said keg through said tap bushing, a dispensing faucet secured laterally to said tap body, a vent tube structure disposed axially of said tap body and comprising a vertical tube extending upwardly through said tap body to adjacent the top of said keg and having a diameter substantially less than the inside diameter of said tap body to provide for gravity flow of beer downwardly in the space between said tube and said tap body, means to seal said space at the outer end of said tap body, manually controllable valve means at the outer end of said structure to release the gas pressure from said keg through said tube, a vent tube extending axially inside said vertical tube, and a check valve at the upper end of said vent tube within and protected by said vertical tube, said check valve being constructed to prevent the escape of pressure from the keg and to bleed air into the keg to compensate with lowering of the head of beer in the keg.

3. In combination with a beer keg having a tap bushing in the bottom end, a beer dispenser comprising a tubular tap body coupled to said tap bushing and adapted to receive beer by gravity flow from said keg through said tap bushing, a dispensing faucet secured laterally to said tap body, a vent tube structure disposed axially of said tap body and comprising a vertical tube extending upwardly through said tap body to adjacent the top of said keg and having a diameter substantially less than the inside diameter of said tap body to provide for gravity flow of beer downwardly in the space between said tube and said tap body, means sealing said space at the outer end of said tap body, manually controllable valve means at the outer end of said structure to release the gas pressure from said keg through said tube, a vent tube extending axially inside said vertical tube, a check valve at the upper end of said vent tube within and protected by said vertical tube, said check valve being constructed to prevent the escape of pressure from the keg and to bleed air into the keg to compensate with lowering of the head of beer in the keg, means at the outer end of said vent tube to secure a $CO_2$ cartridge thereto, and valve means including said cartridge securing means to selectively admit air to said vent tube or to admit $CO_2$ thereto from said cartridge.

4. A device for the gravity dispensing of beer from a keg having a tap bushing in one end frictionally seating a cork, comprising three concentric tubular members; the outer tubular member comprising a tap body having an inner end adapted to be secured within the tap bushing, a coupling sleeve threaded to said tap body adjacent the inner end thereof for coupling said tap body to said tap bushing, said tap body then being threaded into said sleeve to partially unseat the cork in said tap bushing, a faucet laterally secured to and communicating with said tap body to discharge beer by gravity when the keg is inverted with the tap bushing in the bottom, with the beer draining directly from the keg through the tap bushing into the tap body and to the faucet, and means to seal said tap body to the end of the tap bushing upon said tap body being threaded into said coupling sleeve; the intermediate tubular member adapted to extend to the upper end of the keg and having an open inner end, means to secure and seal the outer wall of the intermediate member in the outer end of said tap body, means closing the outer end of the intermediate member, and a manually controlled escape valve communicating with the outer end of the intermediate member for release of initial pressure head in the keg prior to draughting of beer; and the inner member extending upwardly in the intermediate member and including a check valve at its upper end housed and protected by the intermediate member and providing for free flow of air into the keg to compensate for lowering of the head of beer and preventing the escape of beer and gas from the keg therethrough, and means closing the outer end of the intermediate member and securing and supporting the inner member in place, and the outer end of the inner member being open to the air.

5. A device for the gravity dispensing of beer from a keg having a tap bushing in one end frictionally seating a cork, comprising three concentric tubular members; the outer tubular member comprising a tap body having an inner end adapted to be secured within the tap bushing, a coupling sleeve threaded on said tap body adjacent the inner end thereof for coupling said tap body to said tap bushing, said tap body then being threaded into said coupling sleeve to partially unseat the cork from said tap bushing, a faucet laterally secured to and communicating with said tap body to discharge beer by gravity when the keg is inverted with the tap bushing in the bottom, with the beer draining directly from the keg through the tap bushing into the tap body and to the faucet, and means to seal said tap body to the end of the tap bushing upon said tap body being threaded into said coupling sleeve; the intermediate tubular member adapted to extend to the upper end of the keg and having an open inner end, means to secure and seal the outer wall of the intermediate member in the outer end of said tap body, means closing the outer end of the intermediate member, and a manually controlled escape valve communicating with the outer end of the intermediate member for release of initial pressure head in the keg prior to draughting of beer; and the inner member extending upwardly in the intermediate member and including a check valve at its upper end housed and protected by the intermediate member and providing for free flow of air into the keg to compensate for lowering of the head of beer and preventing the escape of beer and gas from the keg therethrough, and means closing the outer end of the intermediate member and securing and supporting the inner member in place, said means comprising a tubular body extending from the end of the inner member and having a tapered threaded bore therein communicating with the inner member, a cartridge holder having a threaded shank secured in said bore, a hollow cartridge puncturing needle in said shank and adapted to bleed pressurized $CO_2$ from a punctured cartridge in said holder to the inner member for recharging the keg and preserving the beer therein, said tubular body having a vent orifice laterally therethrough from said bore and adapted to be closed when said shank is tightened in the body and adapted to be opened to admit air to the inner member when the shank is loosened in the body.

6. In combination with a beer keg sealed by a removable plug frictionally seated in a tap bushing provided in the lower end of the keg, a dispenser comprising a tubular tap adapted to receive beer from said keg by gravity flow and having the inner end thereof formed with an outer diameter substantially equal to the diameter of the bore of said tap bushing, means threadably connected to said tubular tap outwardly of the inner end thereof for locking said tap to said tap bushing with the inner end of said tap disposed within the bore of the tap bushing and extending short of and near to the plug seated within said bushing, whereby as said tap body is threaded into said means said plug is partially unseated from said bushing by the end of said tap body moving thereagainst, conduit means extending axially within said tap and to the upper end of said keg for establishing communication between the keg and the atmosphere, said conduit means serving to completely unseat said plug from its bushing during the insertion of the conduit means into the keg, and means for sealably connecting said conduit means to said tap.

7. In a gravity dispenser for keg beer having a tubular tap body connected to a tap bushing of the keg and having a dispensing faucet secured laterally to the tap body, the combination of a pair of concentric tubes adjustably supported in said tap body and extending axially therethrough to the upper end of said keg, the lower end of each of said tubes being connected with valve means for establishing fluid connection between its respective tube and the atmosphere, the upper end of the outer of said tubes threadably supporting a tubular housing having ports therein to provide communication between the upper end of the tubes and said keg, and with the upper end of the inner of said tubes supporting a check valve enclosed within said tubular housing, said check valve being constructed to prevent the escape of pressure within the keg and to bleed air into the keg as beer is withdrawn when the valve associated with said inner tube is opened, and with the annular space between said concentric tubes providing for the release of keg pressure when the valve associated with said outer tube is opened.

8. In combination with a container having a carbonated beverage stored under pressure therein and sealed by a cork frictionally seated in a tap bushing provided in one end of the container, a dispenser, comprising, a tubular tap body having an open radially reduced inner end, coupling means interengageable with said bushing and threaded to said tap body for connecting the latter to the bushing with the inner end of said tap body disposed within said bushing to receive beverage from said container through said tap bushing, sealing means within said coupling means and engageable by said tap body as the latter is threaded to said tap bushing for forming a seal between said tap body and tap bushing, said tap body partly forcing said cork from said tap bushing as said tap body is threaded into said bushing, a pair of concentric tubes disposed axially of said tap body and having their inner ends extending to the end of said container opposite to that tap bushing end, said cork being completely removed from said bushing as said tubes are extended through said bushing, means carried by the outer of said tubes for sealably connecting said tubes to the outer end of said tap body, a dispensing faucet secured laterally to said tap body, valve means carried by the outer ends of said tubes for establishing communication between the atmosphere and the respective ends of said tubes, a tubular housing threadably supported on the inner end of the outer of said tubes with said housing being provided with a port establishing communication between the container and the respective inner ends of said tubes, and a check valve carried by the inner end of said inner tube and disposed within said housing, said check valve permitting air entering the inner of said tubes through its associated valve means to flow into said container while preventing air flow from said container through said inner tube, and with the annular clearance formed between said coaxially spaced tubes permitting gas to flow from said container to the atmosphere through the valve means associated with said outer tube to relieve pressure within the container.

References Cited in the file of this patent

UNITED STATES PATENTS

| | | |
|---|---|---|
| 62,864 | Marsh | Mar. 12, 1867 |
| 234,131 | Klier | Nov. 9, 1880 |
| 519,513 | Torchiani | May 8, 1894 |
| 592,295 | Kachel | Oct. 26, 1897 |
| 710,631 | Tietz | Oct. 7, 1902 |
| 1,341,520 | Salazar | May 24, 1920 |
| 2,017,365 | Klein | Oct. 15, 1935 |
| 2,057,068 | Speer | Oct. 13, 1936 |

FOREIGN PATENTS

| | | |
|---|---|---|
| 4,402 | Great Britain | Feb. 20, 1914 |
| 183,736 | Great Britain | Aug. 3, 1922 |
| 39,828 | Denmark | Feb. 11, 1929 |
| 773,858 | France | Sept. 10, 1934 |